United States Patent [19]
Linville, Jr. et al.

[11] Patent Number: 5,696,354
[45] Date of Patent: Dec. 9, 1997

[54] SCALE FOR WEIGHING MATERIAL TRANSPORTED ALONG A MOVABLE CONVEYOR

[75] Inventors: Richard D. Linville, Jr.; Roy E. Meyer; Doran R. Dockstader, all of Sterling, Ill.

[73] Assignee: Sauk Valley Systems, Inc., Sterling, Ill.

[21] Appl. No.: 219,909

[22] Filed: Mar. 30, 1994

[51] Int. Cl.⁶ .................................................. G01G 11/14
[52] U.S. Cl. ............................................ 177/119; 177/145
[58] Field of Search ............................ 177/119, 145; 198/959, 502.4, 810.3

[56] References Cited

U.S. PATENT DOCUMENTS

| | | | |
|---|---|---|---|
| 3,513,921 | 5/1970 | Refer et al. | 198/959 |
| 4,259,918 | 4/1981 | Ward et al. | 198/502.4 |
| 4,682,664 | 7/1987 | Kemp | 177/16 |
| 4,788,930 | 12/1988 | Matteau et al. | 177/16 |
| 5,338,901 | 8/1994 | Dietrich | 177/16 |

OTHER PUBLICATIONS

Milltronics, Single Idler Belt Scale Sep. 1989.
Autoweigh, Universal Conveyor Scale.

*Primary Examiner*—Michael L. Gellner
*Assistant Examiner*—Shih-yung Hsieh
*Attorney, Agent, or Firm*—Patnaude Videbeck & Marsh

[57] ABSTRACT

A scale for weighing material as it is transported along a movable conveyor is disclosed as including a pair of wheatstone bridge load cell assemblies which are mounted subjacent and across a roller assembly forming a part of the conveyor. The entire scale assembly is mounted between the framework stringers of the conveyor by a pair of inexpensive IPS pipes. In accordance with the invention, the entire scale assembly is mountable on differing width conveyor systems simply by changing the lengths of the IPS pipe portions of the scale framework so as to fit the frame on the respective stringers. Input into the dual wheatstone bridge circuits is fed into a computer, along with input relating to the speed (displacement) of conveyor movement to provide data needed for calculating a number of potential output figures. Remote display and monitoring of numerous such conveyor scales provides for ease of monitoring multiple conveyor systems.

11 Claims, 5 Drawing Sheets

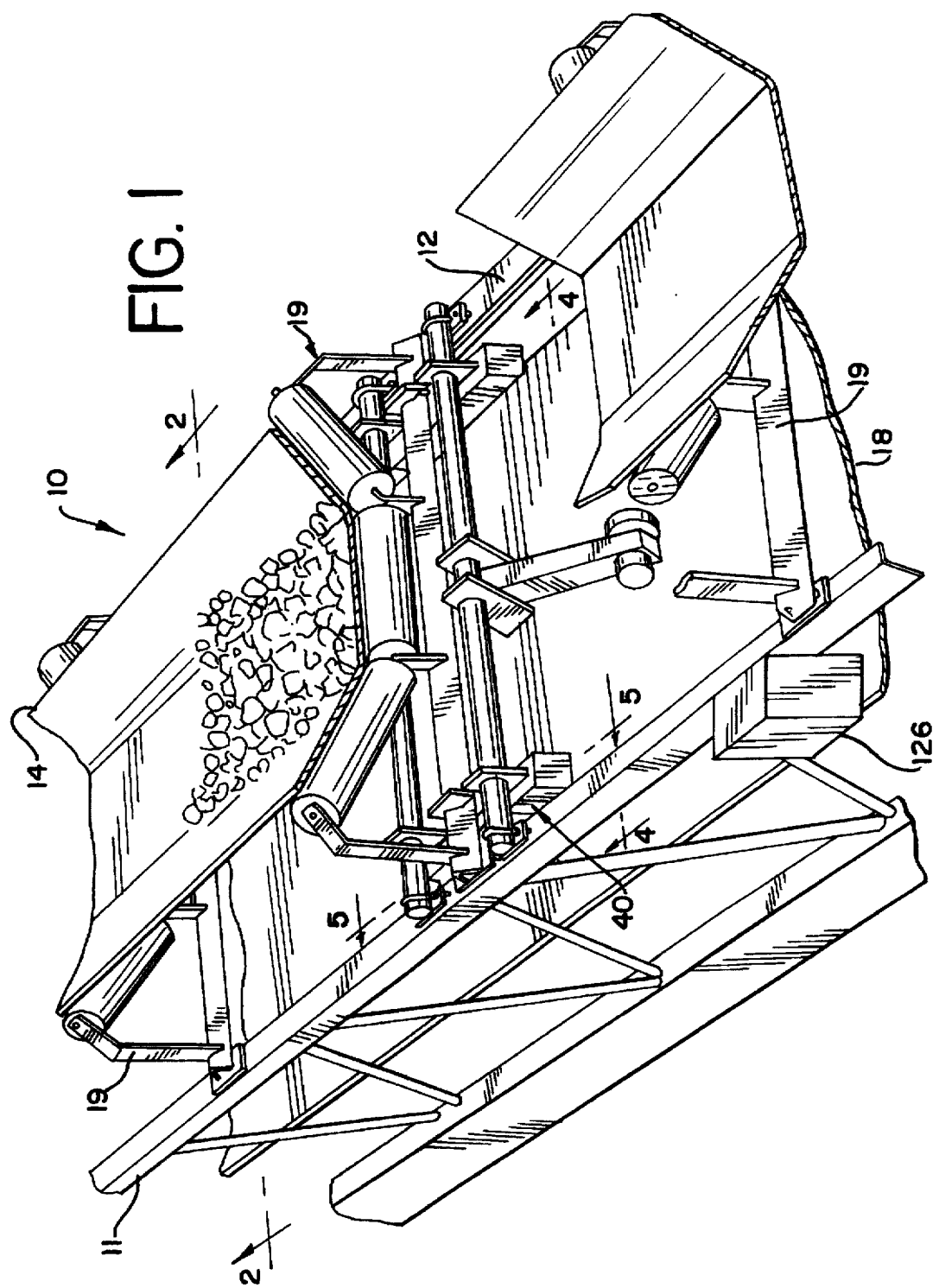

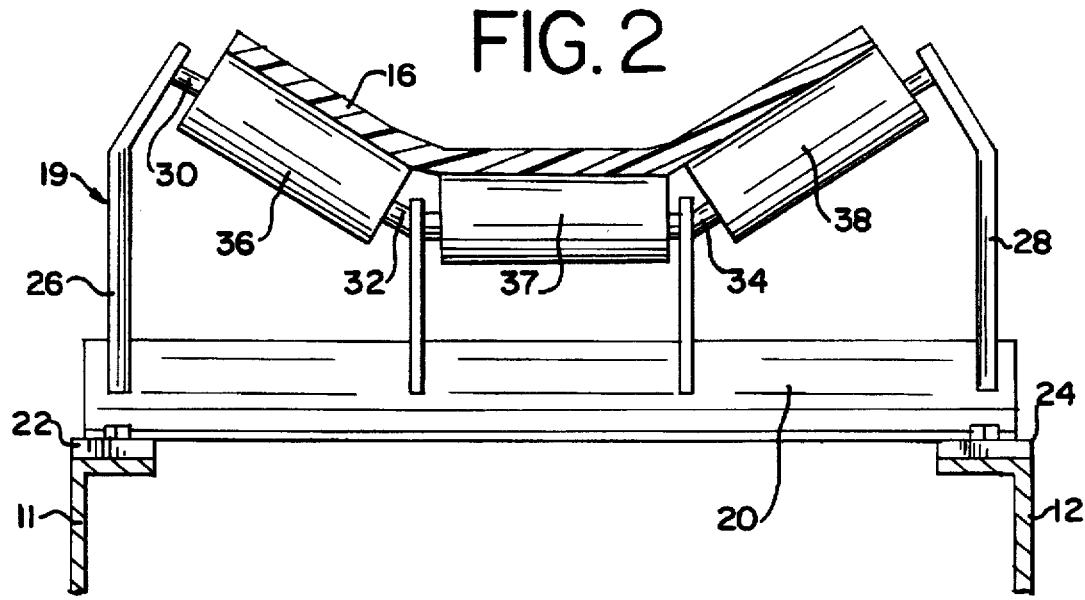
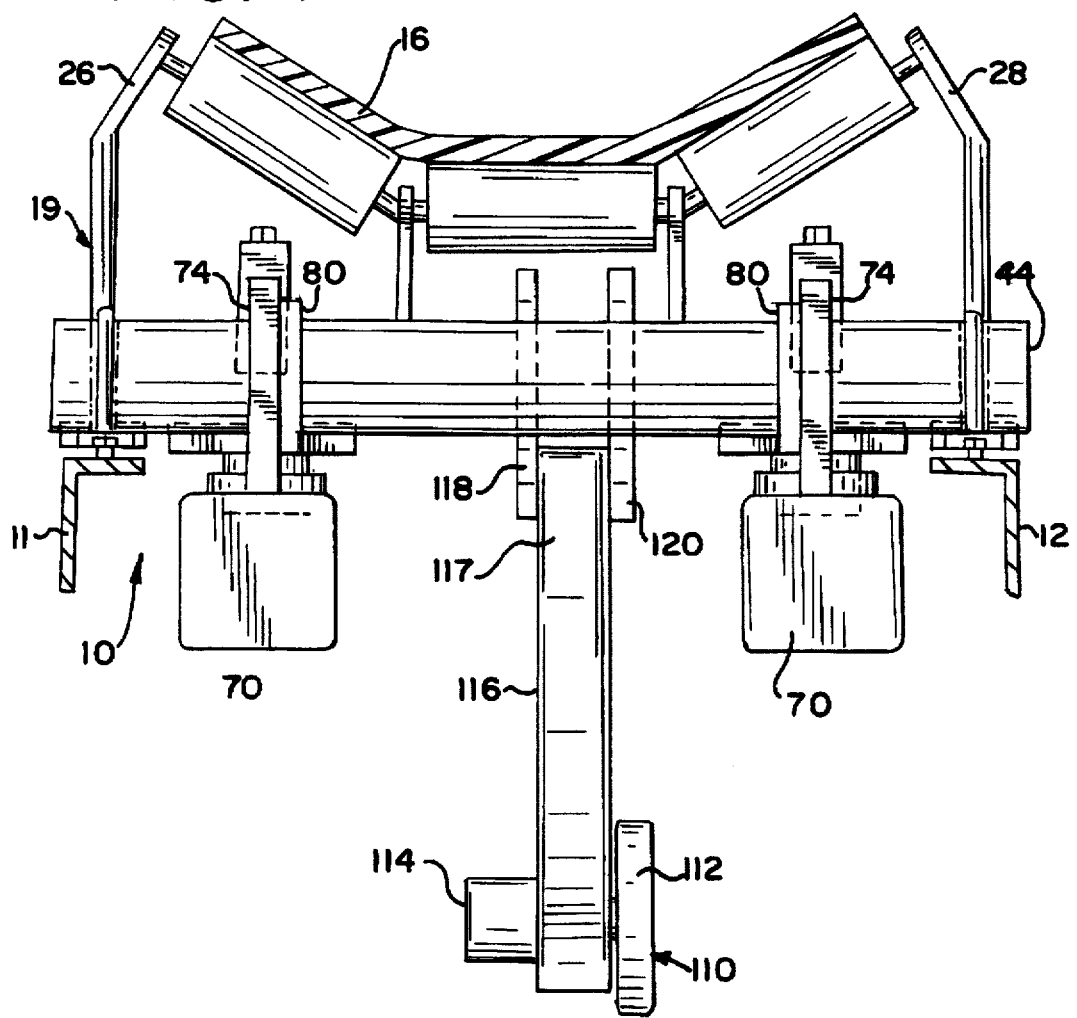

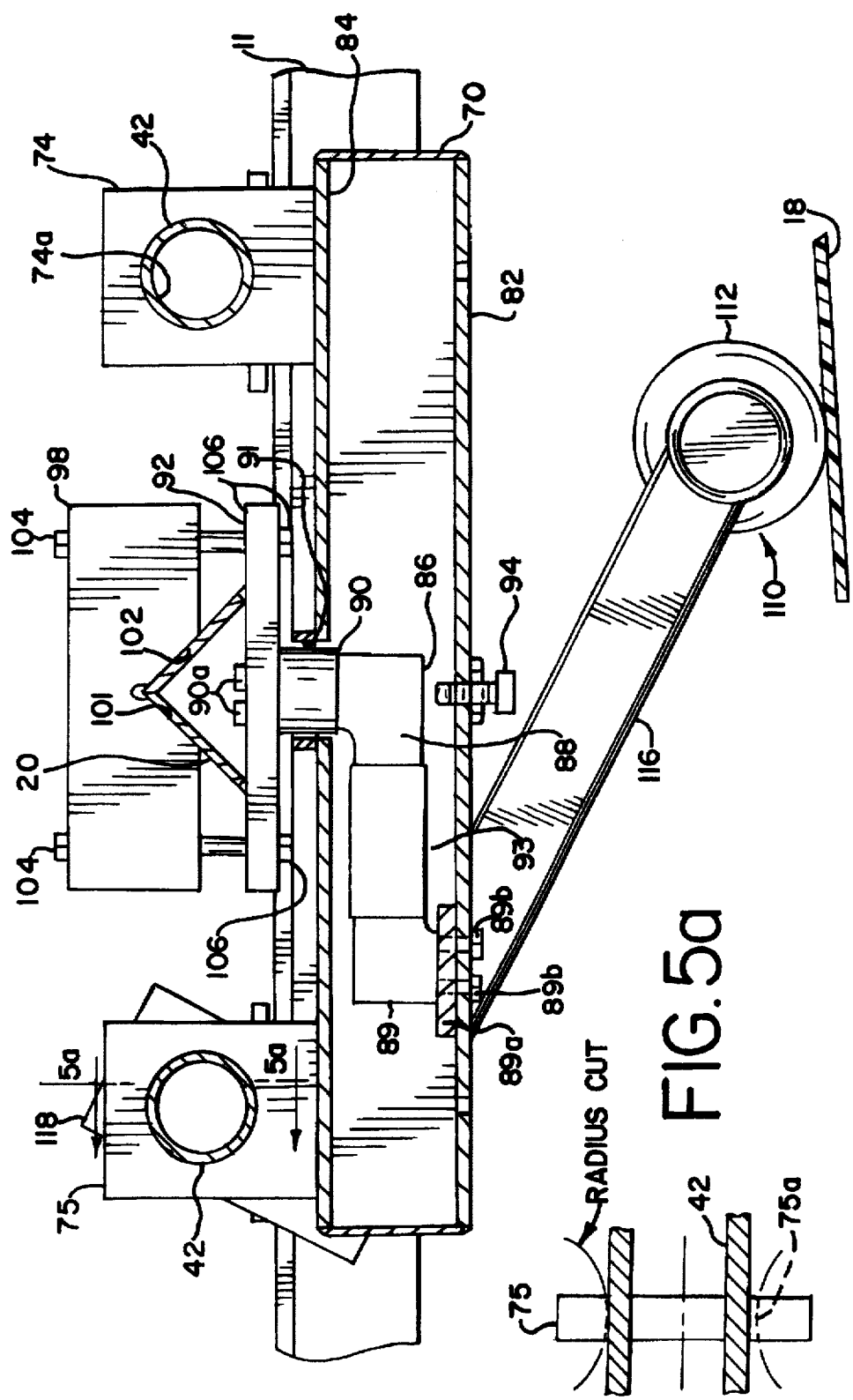

FIG. 6
FIG. 7
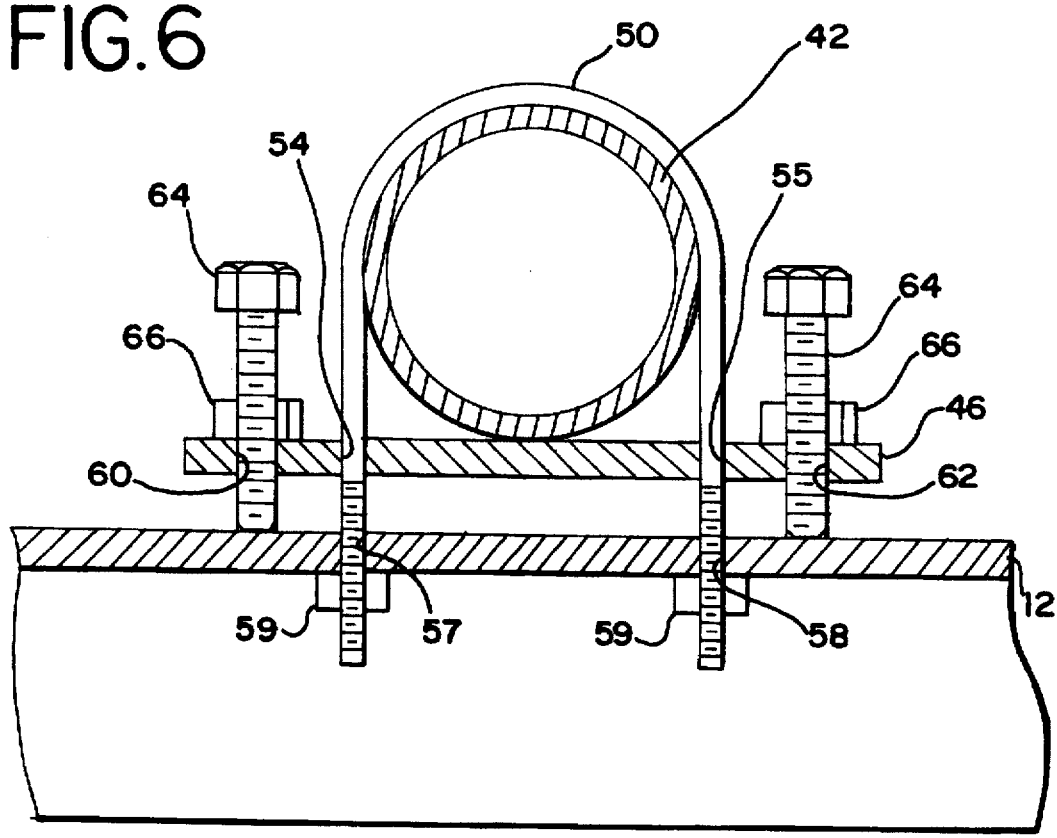
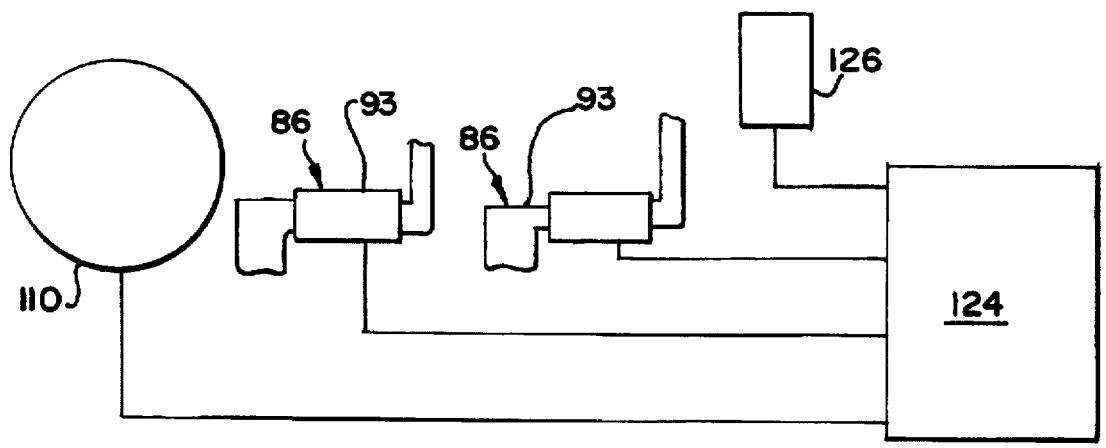

SCALE FOR WEIGHING MATERIAL TRANSPORTED ALONG A MOVABLE CONVEYOR

The present invention relates to scales for weighing material transported along a movable conveyor and, more particularly, to machines that are adaptable to fit between the parallel stringers which support the sides of such movable conveyors.

BACKGROUND OF THE INVENTION

Where a volume of fungible material, such as grain, stone, dirt or the like, is moved by means of a conveyor, it is desirable to weigh the produce which is being transported by the conveyor. Such conveyors normally have a plurality of rollers which support a movable belt, and many existing weighing machines require the modification of at least one of the roller assemblies supporting the conveyor belt for attachment of the weighing machine thereto. Alternately, to accommodate the differences in the distances between the parallel rails which support such conveyors, frequently referred to as stringers, some weighing machines must be specifically manufactured or modified so as to fit the configuration of each of such conveyors.

It would, therefore, be desirable to provide a weighing machine which is adjustable so as to fit between the stringers supporting any conveyor and adaptable to attach to the existing roller assemblies of such conveyor machines without modification thereof.

SUMMARY OF THE INVENTION

Briefly, the present invention is a scale for weighing material transported along a movable conveyor of the type having parallel stringers which are positioned a given width apart along the length thereof. Such conveyor assemblies have a plurality of rollers that extend between the stringers. Each of the ends of the rollers have a mounting for attachment of the roller assembly to one of the stringers.

The scale in accordance with the present invention has first and second mounting members which, in the preferred embodiment, are mounting pipes which extend between the stringers, one on each side of the roller assembly to which the scale is to be attached. Two cross members, each of which has a load cell thereon, are positioned between the mounting pipes with one cross member adjacent each end of the pipes. One of the ends of each roller assembly is mounted on one of the load cells. In the preferred embodiment, the mounting pipes are of commonly available pipe stock which is inexpensively acquired and may be cut to any length.

The scale also includes a means for measuring the speed (incremental motion) at which the conveyor is moving, and a computer for calculating the weight of the material conveyed along the conveyor from the input received from the strain gauge/transducer and the means for measuring the speed of the conveyor.

A scale in accordance with the present invention is thereby attachable between the parallel stringers of any conveyor, and may be mounted under a roller assembly thereof.

GENERAL DESCRIPTION OF THE DRAWINGS

A better understanding of the present invention may be had upon a reading of the following detailed description taken in conjunction with the accompanying drawings wherein:

FIG. 1 is an isometric drawing of a conveyor, including a scale constructed in accordance with the present invention, with portions broken away to show the scale;

FIG. 2 is a cross section view of the conveyor showing a roller assembly mounted on the conveyor stringers thereof;

FIG. 4 is a cross-section view taken along line 4—4 in FIG. 3;

FIG. 5 is a cross-section view taken through line 5—5 of FIG. 3;

FIG. 5a is a fragmentary cross-section view taken along line 5a–5a of FIG. 5;

FIG. 6 is a fragmentary enlarged cross-section view taken along line 6—6 of FIG. 3, and FIG. 7 is a block diagram of the circuitry of the present invention.

DETAILED DESCRIPTION OF A PREFERRED EMBODIMENT

Figure 3:
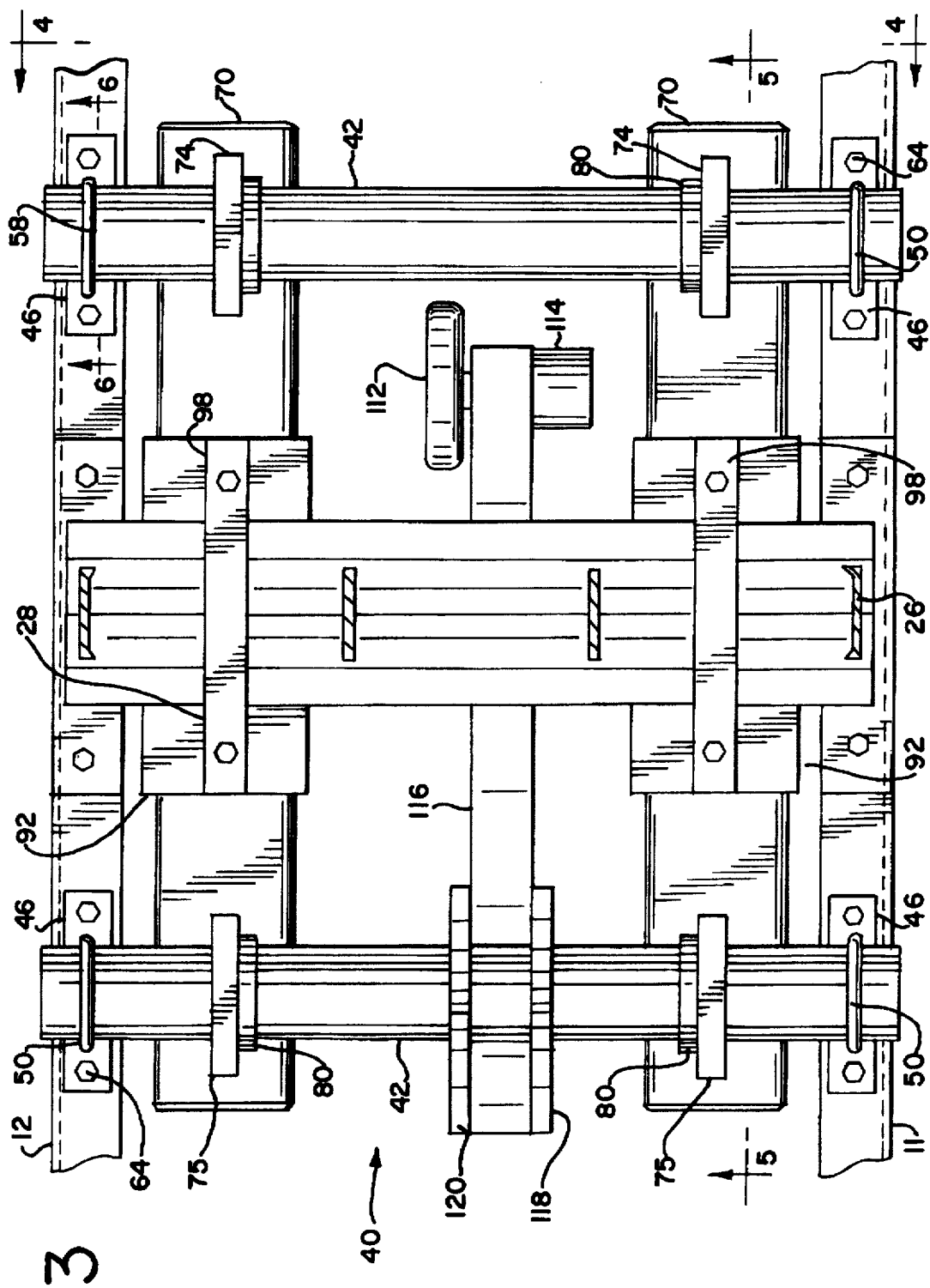
FIG. 3 is a top plan view of the scale shown in FIG. 1 with the rollers removed.

Referring to FIGS. 1 and 2, a conveyor 10 has a frame defined by a pair of parallel beams or stringers 11, 12 between which extend a plurality of spaced roller assemblies 19—19. A conveyor belt 14 has an upper portion 16 which is moved along the upper surfaces of the rollers of the assemblies 19—19 for transporting material thereon. Below the roller assemblies 19—19 is a return portion 18 of the belt 14. There are numerous manufacturers of such belt operated conveyor assemblies, and such conveyors are often manufactured to suit specific purposes such that there is no one standard distance of separation between the parallel stringers 11, 12 thereof.

Referring to FIG. 2, to support the upper portion 16 of the belt 14 such conveyors have a plurality of roller assemblies 19—19, one of which is portrayed therein at 19. The mounting means for assembly 19 has an elongate mounting member 20 positioned perpendicularly between the stringers and feet 22, 24 at each end thereof with holes therein for attachment to the stringers 11, 12. Typically, the mounting member 20 is an angle iron oriented with the corner extending upward as shown. Projecting upwardly from each end of the mounting member 20 are support arms 26, 28, respectively, and connected between the upper ends of the support arms 26, 28 is an axle 30.

The axle 30 has spaced bends 32, 34 along the length thereof, and rotatably mounted on the axle 30 are the rollers 36, 37, 38. The center roller 37 is positioned parallel to the mounting member 20 and each of the side roller 36, 38 angle upwardly from an end of the center roller 37 to the top of one of the support arms 26, 28.

As can be seen, any material transported along the upper portion 16 is cradled between the outer rollers 36, 38 and above the center roller 37 as the belt 14 moves the along the length of the conveyor 10.

Referring to FIGS. 3, 4, 5 and 6, a scale 40 constructed in accordance with the present invention is supported between the parallel stringers 11, 12 and has portions thereof positioned on each side of a roller assembly 19. The scale 40 has first and second adjustable tubular supports 42—42 each of which is sufficiently long to span the greatest distance which is normally encountered between the parallel stringers 11, 12 of any commonly available conveyor. The ends of the supports 42—42 are each attached to a levelling pad 46—46 by a U-bolt 50—50. An important feature of the present invention is that the supports 42—42 are commonly available pipe stock or any other commonly available longitudinal member, such as channel, angle, etc., which are cut to the desired length at the time of installation. The scale 40 can easily be repositioned on the conveyor or moved to another conveyor and will only require replacement of the supports 42—42.

As can be seen in FIG. 6, each U-bolt 50—50 extends around the top of one of the supports 42, and the ends of the U-bolt extend through transverse holes 54, 55 through levelling pads 46—46. The ends of each U-bolt 50—50 also extend through complimentarily positioned transverse holes 57, 58 in the associated stringer 12, and are retained by nuts 59—59. Adjacent the ends of each of the levelling pads 46—46 are transverse threaded holes 60, 62, and threaded into each of the holes 60, 62 is an adjusting bolt 64—64. Each adjusting bolt 64—64 may be turned to move the end thereof which rests on a stringer 12. Turning a bolt 64 clockwise or counterclockwise will raise or lower the levelling pad 46—46 relative to the stringer 12 to which it is attached. Also, a locking nut 66—66 is fitted on each adjusting bolt 64—64 and tightened against the surface of the associated levelling pad 46—46 to prevent further rotation of the adjusting bolt 64—64 after it is properly set.

Referring to FIGS. 3 and 4, extending between the supports 42—42, are a pair of elongate load cell containing cross members 70—70, each of which has a generally rectangular hollow cross section and one of which is positioned near each of the stringers 11, 12. Adjacent each end of each of the cross members 70—70 are upwardly extending longitudinally oriented mounting flanges 74, 75 and each of the mounting flanges has a transverse hole 74a, 75a with, a diameter a little larger than the diameter of the supports 42, 42, for slidably receiving the ends of the supports 42—42 therethrough. As shown most clearly in FIG. 5a, the hole 75a in flange 75 is cut on a radius through the cross section which allows each cross member to move slightly so as to allow a load cell 86 (FIG. 5) therein be self-centering with respect to the conveyor belt 14. This slight movability provides for the cancellation of extraneous factors which might cause error in balancing the load cell circuit. Clamps 80—80 positioned to abut each of the mounting flanges 74, 75 and mounted around the supports 42—42 limit the lateral movement of the load cell containing cross members 70—70 along the supports 42—42 to maintain one cross member 70 adjacent each of the stringers 11, 12.

Referring to FIG. 5, each of the cross members 70—70 has a hollow interior and has a bottom wall 82, an upper wall 84, and bolted to the lower wall 82 is a load cell assembly 86. Each load cell assembly 86—86 is of a type commonly known in the art as a wheatstone bridge, and includes a generally horizontally oriented bar 88 one end 89 of which is bolted to a plate 89a bolted at 89b—89b to the lower wall 82 of each of the cross members 70—70. The opposing end of each of the horizontal bars 88 has a round spacer 90 held by bolts 90a–90a which projects through an aperture 91 in the associated upper wall 84. On the top of spacer 90 is bolted a transverse plate 92 for bearing a load and transmitting that load to the load cell assembly 86. The central portion of the horizontal bar 88 has a single point load cell 93 thereon which is sensitive to the stresses caused in the horizontal bar 88 by a load supported on the transverse plate 92, and provides an electronic signal which is proportional to the amount of the load normal to the transverse plate 92, as is well known in the art. Single point load cells are superior to other measuring means as they only measure a force normal to the cell, in this case ignoring belt friction and any moment around the roller assembly 19. Each cross member 70—70 further has a limit screw 94 in lower wall 82 which is positioned below the cantilevered end of the bar 88 to prevent overload of the horizontal bar 88. Typically, each load cell 93 has a hollow area therein (not shown) which is a binocular cross section shape having mounting positions for four strain gauges or transducers thereon, as is well known in the art. Each strain gauge/transducer forms a resistor in a wheatstone bridge.

The mounting member 20 of the roller assembly 19 is supported at its ends upon one of the transverse plates 92 and the ends of the mounting member 20 are securely attached to the transverse plates 92 by generally rectangular mounting plates 98—98. Referring to FIG. 5 in which one mounting plate 98 can be seen, each of the mounting plates 98—98 has an angled portion with sides 101, 102 removed therefrom to receive the upwardly extending corner of the angle iron of the mounting member 20. Each of the mounting plates 98—98 is retained on its associated transverse plate 92—92 by a pair of bolts 104—104, one at each of the ends, which extend through complementarily positioned holes in the associated transverse plates 92. The bolts 104—104 are retained by nuts 106—106 as shown, or may be retained by threading the holes in plates 92. If the mounting member 20 is made of channel iron, the mounting plates 98—98 may be positioned flat side down to retain the mounting member rigidly with respect to transverse plate 92.

The scale 40 further includes an incremental motion sensing means 110 which includes a wheel 112 adapted to roll upon the return portion 18 of the conveyor belt 14 and rotate a shaft to a device 114 which converts the linear displacement of the belt into an electronic signal. The device 114 may be in the form of a generator which will produce a voltage proportional to the speed at which the wheel rotates, or may produce electronic impulses the rate of which is proportional to the displacement of the wheel 112 along the lower conveyor belt 18.

The wheel 112 and device 114 are fitted at one end of an elongate bar 116. The opposing end 117 of the elongate bar 116 has first and second side brackets 118, 120 each of which has a transverse hole therein, having a diameter large enough to slidably receive one of the supports 42—42. The brackets 118, 120 are slidably fitted over one of the supports 42 between the cross members 70—70. A pair of clamps 80—80 around the support 42 prevent lateral movement of the bar 116 along the support 42. Typically, the brackets 118, 120 of the speed sensing means 110 are fitted upon one of the supports 42—42 and positioned with the wheel 112 on the return portion 18 of the conveyor belt 14. In the event the return portion 18 of the conveyor belt 14 cannot be reached by the wheel 112 when the bar 116 is attached to one of the supports 42—42, the brackets 118, 120 can be attached to any suitable bar on the conveyor which will permit the wheel 112 to rotate upon the return portion 18 of the belt 14.

Referring to FIG. 7, the present invention also includes a computer 124 which receives signals from the two load cells 93—93 and from the incremental motion sensing means 110. From these signals, the computer calculates the weight of the material being conveyed across the scale 40. While it is understood that such a weight can be calculated using a single wheatstone bridge, applicant's invention obtains more accurate readings of weight by using a pair of such circuits.

The invention also includes an optional angle sensing device 126 which may be retained on one of the stringers 11, 12 of the conveyor 10 if the conveyor is portable. The sensing device 126 is of the type Which generates a signal proportional to the angle of the stringer 11 or 12 to which the device 126 is attached. The computer 124 then compensates for the prior calculations by taking the weight and dividing by the cosine of the angle to get a resultant of the force to include a factor for the angle of the conveyor as indicated by the signal received from the angle indicating device 126.

INSTALLATION

To install the present invention on a conveyor the load cell cross members 70—70 are mounted on the roller assembly mounting member 20, being sandwiched between transverse plates 92—92 and mounting plates 98—98 using bolts 104—104, then two sections of pipe are cut to lengths a little longer than the distances between stringers to which the scale is to be attached to make the supports 42—42. The supports 42—42 are then fitted through the holes in the mounting flanges 74, 75 at the ends of the cross members 70—70, with the brackets 118, 120 of the bar 116 positioned on one of the supports 42 between the cross members 70—70. Next, the assembly is positioned between the stringers 11, 12 of a conveyor and holes 57, 58 drilled therein to receive U-bolts 50—50. The levelling pads 46—46, adjusting bolts 64—64, U-bolts 50—50 and associated nuts are then loosely assembled. The U-bolts are attached to the supports 42—42, and the nuts 59—59 at the bottom of each U-bolt are not tightened.

Then the bolts holding the mounting member 20 of the roller assembly 19 to the stringers 11, 12 are disconnected and the feet 22, 24 of the roller assembly 19 may be cut off to prevent future interference from these parts, if necessary. The mounting member 20 is then secured to the transverse plates 92—92 mounted on the load cell assemblies 86—86 by the bolts 104—104, which may be threaded into the mounting plates 98—98, or retained by nuts 106—106. Thereafter, the bolts in the levelling pads 46—46 are rotated inwardly through the transverse threaded holes 60, 62 until the ends of the roller assembly 19 are lifted at least one eighth inch above each of the stringers 11, 12. The lock nuts 66—66 are then tightened to retain the desired elevation of the levelling pad above the stringer. Thereafter, the nuts 59—59 at the bottom of each U-bolt are tightened. The output lines from the load cells 86—86, the speed sensing means 110, and the angle sensing device 126 can then be communicatively attached to the computer 124. Thus, the roller assembly 19 is mounted on the load cells 86—86 by being rigidly sandwiched between the transverse plates 92—92 and the mounting plates 98—98, respectively.

Since the roller assembly 19 is raised slightly from stringers 11, 12, shims (not shown) may be positioned between upstream and downstream roller assemblies 19—19 and stringers 11, 12 to level belt travel across the scale.

The angle sensing device may be attached to a stringer 11, 12 such that the device accurately reads the angle of incline of the stringer 12.

Thus, an improved scale for measuring the weight of material transported across a conveyor has been shown and described. The scale of the invention provides improved mountability on conveyor stringers and inexpensive mountability on conveyors having differing widths between stringers. The dual single point load cell circuitry provided with the invention enhances the accuracy of the scale, and the loose mounting of the load cell containers provides a self-centering capability to the load cells increasing the accuracy of weight measurement.

What is claimed:

1. A scale for weighing material transported along a movable conveyor, said conveyor including spaced stringers and a roller assembly extending transversely between said spaced stringers, said scale comprising in combination:

a weight measuring device, means extending transversely between said stringers for mounting said weight measuring device thereon with said roller assembly being mounted on said measuring device, an improvement wherein said means extending transversely between said stringers include a commonly available, substitutable structural member whose proper length is determined by the transverse distance between the spaced stringers for providing ease of mountability of said scale on at least one of various conveyors having differing widths between stringers.

2. The scale as defined in claim 1 wherein said means extending transversely between said stringers include common pipe stock.

3. The scale as defined in claim 1 wherein said means extending transversely between said stringers include a pair of commonly available, substitutable structural members positioned in spaced relation between said stringers, said weight measuring device being mounted on and positioned between said pair of structural members, and said roller assembly being mounted on said weight measuring device and positioned in spaced relation above and between said stringers.

4. The scale as defined in claim 1 wherein said weight measuring device includes a single point load cell.

5. The scale as defined in claim 1 further including means adjacent said weight measuring device for determining incremental motion of a belt on said conveyor.

6. The scale as defined in claim 3 wherein said weight measuring device includes a pair of load cell mounting members with each member including a load cell mounted thereon, each load cell mounting member being loosely mounted on and between said pair of commonly available, substitutable structural members for providing self-centering capability to said pair of load cell mounting members and said load cells, respectively, mounted thereon.

7. A scale for weighing material transported along a movable conveyor having spaced stringers, a roller assembly extending between said stringers, and a movable belt thereon, said roller assembly including means for mounting said roller assembly on said stringers, said scale comprising in combination:

first and second supports, each of said supports mounted in spaced relation to each other and across said stringers, a first cross member extending substantially parallel to a length direction of said movable belt between said first and said second supports, load cell means mounted on said cross member, means on said load cell for supporting said roller assembly thereabove;

means for measuring the incremental movement of said movable belt on said conveyor, and computer means for calculating the weight of material conveyed along said conveyor using input from said load cell means and an input from said means for measuring the incremental movement of said movable conveyor belt.

8. A scale in accordance with claim 7 further comprising a second cross member positioned in spaced relation to said first cross member and extending substantially parallel to a length direction of said movable belt between said first and second supports.

9. A scale in accordance with claim 7 further comprising:

angle sensing means for measuring any angular slope of said conveyor relative to the horizontal and providing a signal proportional to said angular slope to said computer means.

10. A scale for weighing material transported along a movable conveyor having spaced stringers, a roller assembly extending between said stringers, and a movable belt thereon, said roller assembly including means for mounting said roller assembly on said stringers, said scale comprising in combination:

first and second supports, each of said supports mounted in spaced relation to each other and across said stringers, a first cross member extending substantially parallel to a length direction of said movable belt between said first and said second supports, load cell means mounted on said cross member, means on said load cell for supporting said roller assembly thereabove;

means for measuring the incremental movement of said movable belt on said conveyor, computer means for calculating the weight of material conveyed along said conveyor using input from said load cell means and an input from said means for measuring the incremental movement of said movable conveyor belt, and means for loosely connecting said cross member positioned between said first and second supports, said means for connecting providing for self-centering movement between said cross member and said first and second supports in response to a load on said conveyor.

11. A scale in accordance with claim 10 further comprising a second cross member positioned in spaced relation to said first cross member and extending substantially parallel to a length direction of said movable belt between said first and second supports.

* * * * *